United States Patent
Post et al.

(10) Patent No.: US 10,916,976 B2
(45) Date of Patent: Feb. 9, 2021

(54) AXIAL FLUX ELECTRIC MACHINE AND METHODS OF ASSEMBLING THE SAME

(71) Applicant: Regal Beloit America, Inc., Beloit, WI (US)

(72) Inventors: Steven W. Post, Cassville, MO (US); Jay Matthew Cupps, Cassville, MO (US); Stephen Thomas English, Englewood, OH (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 232 days.

(21) Appl. No.: 16/112,327

(22) Filed: Aug. 24, 2018

(65) Prior Publication Data

US 2020/0067356 A1    Feb. 27, 2020

(51) Int. Cl.

| | |
|---|---|
| H02K 1/14 | (2006.01) |
| H02K 1/18 | (2006.01) |
| H02K 1/27 | (2006.01) |
| H02K 3/32 | (2006.01) |
| H02K 15/02 | (2006.01) |
| H02K 15/10 | (2006.01) |
| H02K 21/24 | (2006.01) |

(52) U.S. Cl.
CPC .............. *H02K 1/148* (2013.01); *H02K 1/182* (2013.01); *H02K 1/2793* (2013.01); *H02K 3/325* (2013.01); *H02K 15/022* (2013.01); *H02K 15/10* (2013.01); *H02K 21/24* (2013.01); *H02K 2203/12* (2013.01)

(58) Field of Classification Search
CPC ............ H02K 1/14; H02K 1/148; H02K 1/18; H02K 1/182; H02K 1/2793; H02K 3/325; H02K 15/022; H02K 15/10; H02K 21/24; H02K 2203/12

USPC .......................... 310/51, 198, 208, 218, 268
See application file for complete search history.

(56) References Cited

U.S. PATENT DOCUMENTS

| | | | | |
|---|---|---|---|---|
| 7,592,733 | B2 * | 9/2009 | Naitou ................... | A61G 5/045 180/65.1 |
| 9,935,525 | B2 | 4/2018 | Koiwai et al. | |
| 2006/0103263 | A1 * | 5/2006 | Naito ...................... | B60L 53/80 310/268 |
| 2008/0061649 | A1 * | 3/2008 | Kim ........................ | H02K 1/14 310/156.32 |

(Continued)

FOREIGN PATENT DOCUMENTS

| | | |
|---|---|---|
| CN | 103855900 A | 6/2014 |
| CN | 103956841 A | 7/2014 |

(Continued)

OTHER PUBLICATIONS

EP Extended Search Report for application 19193013.0 dated Jan. 22, 2020; 8 pp.

*Primary Examiner* — Tulsidas C Patel
*Assistant Examiner* — Rashad H Johnson
(74) *Attorney, Agent, or Firm* — Armstrong Teasdale LLP

(57) ABSTRACT

A stator assembly for use in an axial flux electric motor includes a plurality of tooth assemblies and a plurality of circumferentially-spaced stator bases that are each coupled to at least one tooth assembly. The stator assembly also includes a plurality of circumferentially-spaced bridge members. Each bridge member is configured to engage a pair of circumferentially adjacent stator bases to apply an axial pre-load force to the pair of stator bases and to create a flux path between the adjacent stator bases.

19 Claims, 5 Drawing Sheets

(56) References Cited

U.S. PATENT DOCUMENTS

| | | | |
|---|---|---|---|
| 2011/0037335 A1* | 2/2011 | Jang | H02K 1/148 |
| | | | 310/156.32 |
| 2011/0221297 A1* | 9/2011 | Langford | H02K 15/024 |
| | | | 310/215 |
| 2011/0316381 A1 | 12/2011 | Asano et al. | |
| 2014/0132106 A1 | 5/2014 | Horst et al. | |
| 2014/0265653 A1 | 9/2014 | Heins et al. | |
| 2017/0302144 A1 | 10/2017 | Boaventura-Delanoe | |
| 2018/0205280 A1* | 7/2018 | Henry | H02K 3/522 |
| 2018/0323663 A1* | 11/2018 | Ogawa | H02K 1/2793 |

FOREIGN PATENT DOCUMENTS

| | | |
|---|---|---|
| CN | 103997145 A | 8/2018 |
| DE | 102016203140 A1 | 8/2017 |
| EP | 2224577 A1 | 9/2010 |
| EP | 2453557 A2 | 5/2012 |

\* cited by examiner

AXIAL FLUX ELECTRIC MACHINE AND METHODS OF ASSEMBLING THE SAME

BACKGROUND OF THE INVENTION

The field of the invention relates generally to electrical machines, and more particularly, to axial flux electric motors having a modular stator.

One of many applications for an electric motor is to operate a pump or a blower. The electric motor may be configured to rotate an impeller within a pump or blower, which displaces a fluid, causing a fluid flow. Many gas burning appliances include an electric motor, for example, water heaters, boilers, pool heaters, space heaters, furnaces, and radiant heaters. In some examples, the electric motor powers a blower that moves air or a fuel/air mixture through the appliance. In other examples, the electric motor powers a blower that distributes air output from the appliance.

In some known axial flux electric motors, partial stator teeth with attached tooth tips are attached to U-shaped stator members and the stator core, bobbins, and windings are over-molded with a resin to secure the stator components together. However, over-molding the stator increases the motor manufacturing and labor costs and also limits the power produced by the motor because of heat built up within the over-molded stator.

Another known axial flux electric motor includes a press-together lamination system where a pair of stator teeth are pressed into a single stator base. However, such a configuration limits the motor type to a multiple of 10 pole motor.

BRIEF DESCRIPTION OF THE INVENTION

In one aspect, a stator assembly for use in an axial flux electric motor is provided. The stator assembly includes a plurality of tooth assemblies and a plurality of circumferentially-spaced stator bases that are each coupled at least one tooth assembly. The stator assembly also includes a plurality of circumferentially-spaced bridge members that are each configured to engage a pair of circumferentially adjacent stator bases.

In another aspect, an axial flux electric motor is provided. The axial flux electric motor includes a rotor assembly and a stator assembly coupled to the rotor assembly to define an axial gap therebetween. The stator assembly includes a plurality of tooth assemblies and a plurality of circumferentially-spaced stator bases that are each coupled at least one tooth assembly. The stator assembly also includes a plurality of circumferentially-spaced bridge members that are each configured to engage a pair of circumferentially adjacent stator bases to apply an axial pre-load force to the pair of stator bases.

In yet another aspect, a method of assembling an axial flux electric motor is provided. The method includes coupling a plurality of circumferentially-spaced stator bases to a frame. The method also includes coupling at least one tooth assembly to each stator base and coupling a bridge member to a pair of circumferentially adjacent stator bases. The bridge member is coupled to the stator bases such that the bridge member extends between the circumferentially adjacent stator bases.

DETAILED DESCRIPTION OF THE INVENTION

Described herein are exemplary methods and systems for axial flux electric motors. The axial flux motor includes a multiphase stator assembly having substantially similar stator bases and substantially similar tooth assemblies made from economical laminations. In one embodiment, the stator bases and tooth assemblies are separate components joined together to enable a modular construction. In another embodiment, each stator base is integrally formed with at least one tooth assembly. A bridge member is coupled between circumferentially adjacent stator bases to both apply an axial pre-load force to the stator bases and also to facilitate the flow of flux between adjacent stator bases. The laminations that make up the bridge member are oriented such that the flux direction does not create eddy currents but yet allows the lamination direction to create a structural member to hold the stator components in place. The mechanical joints between the stator bases and the bridge member hold the stator assembly together without the need to over-mold the stator assembly with resin, thus reducing the cost and increasing the efficiency of the motor. The resulting configuration allows for a customized motor size and also for relatively small motors for use in high speed applications.

Figure 1:
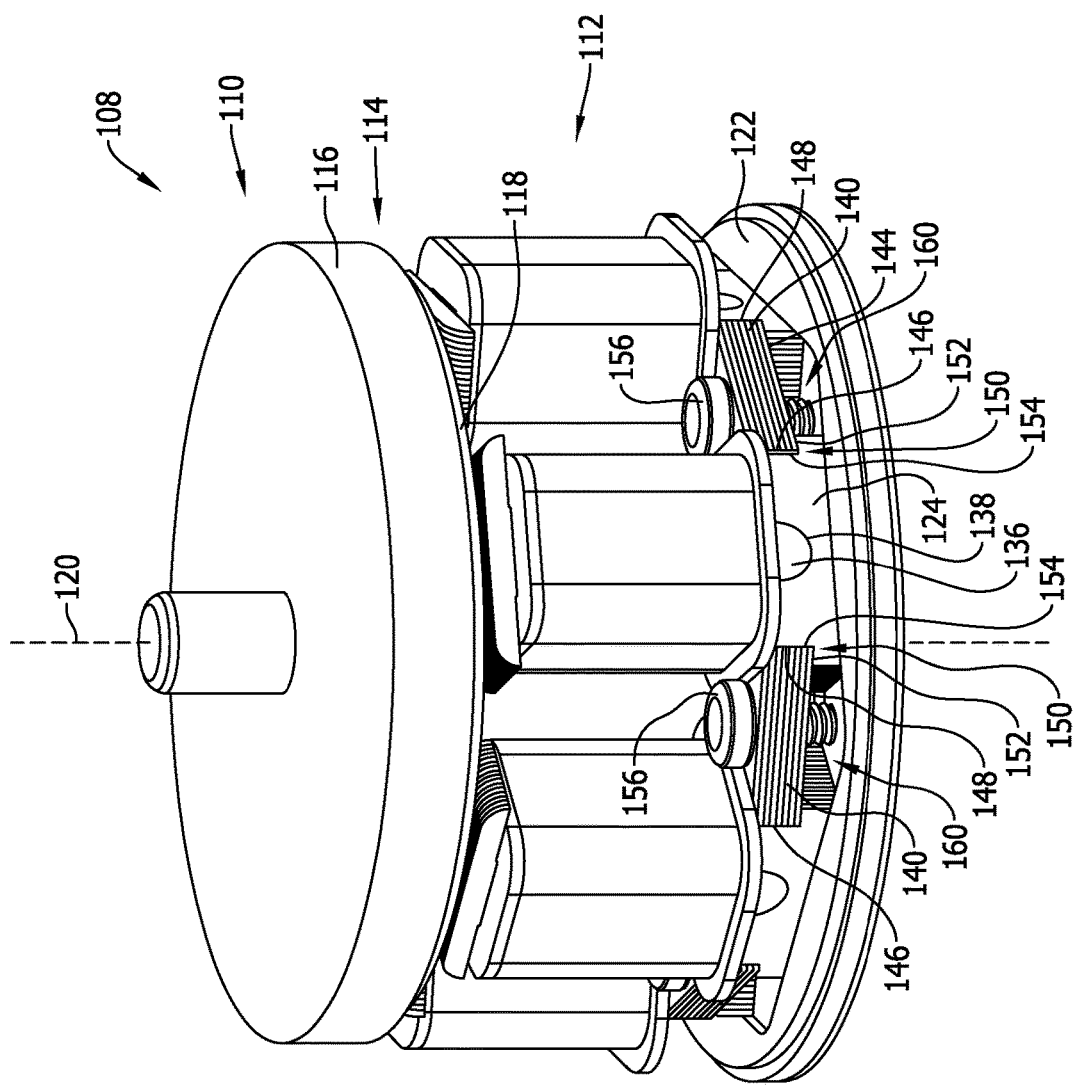
FIG. 1 is a perspective view of an exemplary motor.
Figure 2:
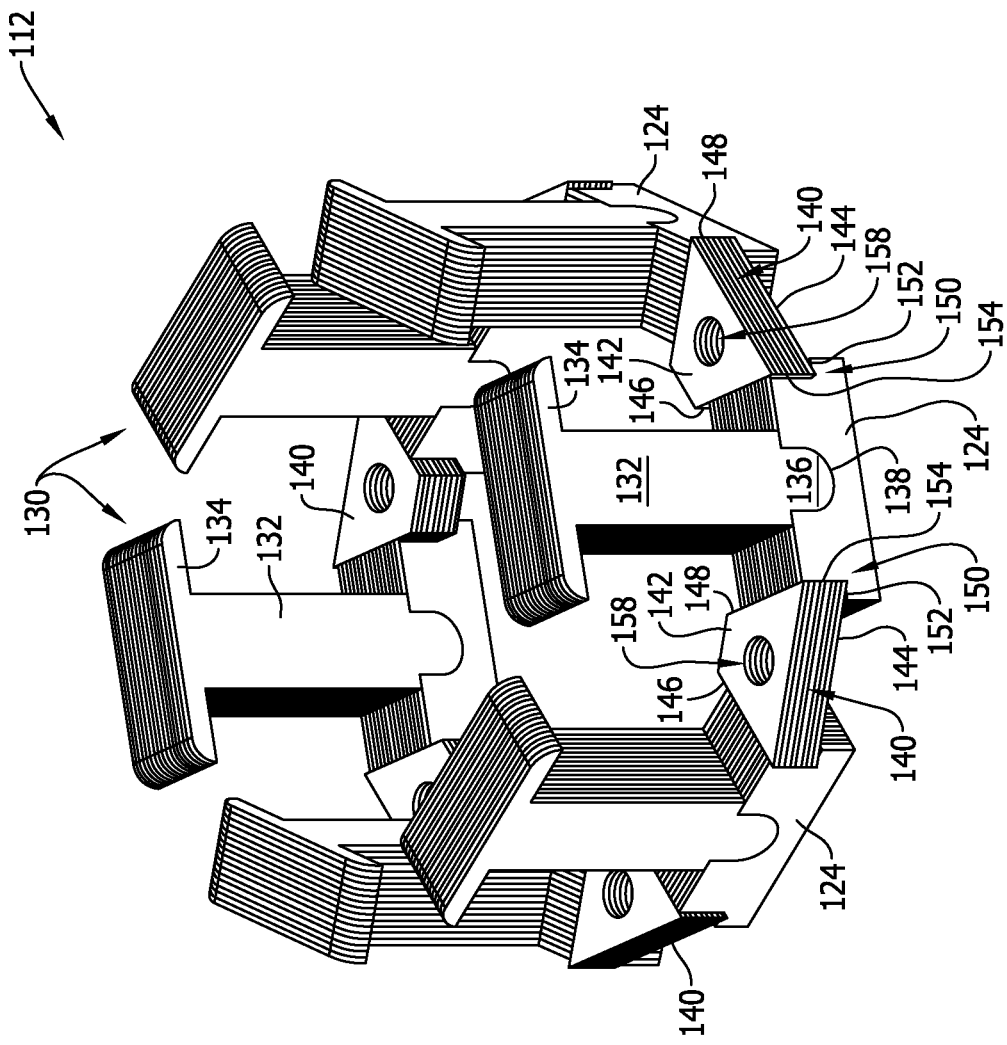
FIG. 2 is a perspective view of an exemplary stator assembly for use with the motor shown in FIG. 1.

FIG. 1 is a perspective view of a motor 108. FIG. 2 is a perspective view of an exemplary stator assembly 112 for use with motor 108. In the exemplary embodiment, motor 108 is an axial flux electric motor including a rotor assembly 110 and a stator assembly 112 coupled to rotor assembly 110 to define an axial gap 114 therebetween. Rotor assembly 110 generally includes a rotor 116 and at least one permanent magnet 118 coupled to rotor 116. In the exemplary embodiment, permanent magnet 118 is fabricated from ferrite and is formed as single disc having a plurality of poles. Alternatively, permanent magnet 118 includes a plurality of magnet segments coupled to rotor 116. Generally, any suitable permanent magnet shape, segment count, and material may be used that enables motor 108 to function as described herein. Rotor assembly 110 is rotatable within motor casing 106 about an axis of rotation 120. In the exemplary embodiment, motor 108 is energized by an electronic control (not shown), for example, a sinusoidal or trapezoidal output electronic control. In the exemplary embodiment, rotor 116 is machined and/or cast from any suitable material, for example, steel.

Stator assembly 112 is a multi-phase (more than one phase) axial flux stator, and is preferably a three-phase axial flux stator producing flux in the axial direction (i.e., parallel to axis of rotation 120). Stator assembly 112 includes a motor frame 122 coupled to blower housing 102 and at least one stator base 124 coupled to motor frame 122. In the exemplary embodiment, stator assembly 112 includes a plurality of circumferentially-spaced stator bases 124 coupled to motor frame 122. Stator assembly 112 also includes a plurality of tooth assemblies 130 that each include a stator tooth 132 coupled to a tooth tip 134. Alternatively, tooth assemblies 130 may include only stator tooth 132 and not tooth tip 134.

As described in further detail below, in the exemplary embodiment, each stator base 124 is coupled to at least one tooth assembly 130. As used herein, the term "coupled" is meant to describe both a mechanical joining of separate components and also to describe configurations where the components are integrally formed as a unitary member. For example, in the exemplary embodiment, stator bases 124 and tooth assemblies 130 are formed separately and coupled together by inserting at least one tooth assembly 130 into each stator base 124, as described below. In another embodiment, stator bases 124 and tooth assemblies 130 are coupled together by integrally forming each stator base 124 with at least one tooth assembly 130 from a single lamination. In both configurations, each stator base 124 is "coupled" to at least one tooth assembly 130 either by a positive mechanical joint or by integral forming.

In the exemplary embodiment, each stator tooth 132 includes an insertable portion 136 and each stator base 124 includes at least one receiving slot 138 configured to receive insertable portion 136 to form a mechanical joint between stator base 124 and stator tooth 132. As used herein, the term "mechanical joint" is meant to describe a portion of a machine where one mechanical part is connected to another. Specifically, a mechanical joint is formed by joining metal parts through a positive-holding mechanical assembly. More specifically, in the exemplary embodiment, mechanical joint 139 is an interference fit between stator base 124 and stator tooth 132 where the external dimension of one part slightly exceeds the internal dimension of the part into which it has to fit. As such, insertable portion 136 and receiving slot 138 hold tooth assembly 130 and stator base 124 together without the need to over-mold stator assembly 112 with resin, thus reducing the cost and increasing the efficiency of motor 108.

In the exemplary embodiment, each stator base 124 includes a single receiving slot 138 and a relief slot (not shown). Furthermore, stator base 124 includes a post (not shown) positioned between the relief slot and receiving slot 138. In operation, as insertable portion 136 of stator tooth 132 is inserted into receiving slot 138, the post will slightly deform to account for a taper angle of insertable portion 136, which will result in a similar deformation of the relief slot. As such, the retention forces on both sides of insertable portion 136 are equal and tooth assembly 130 maintains an orientation perpendicular to stator base 124 and parallel to axis 120.

Figure 3:
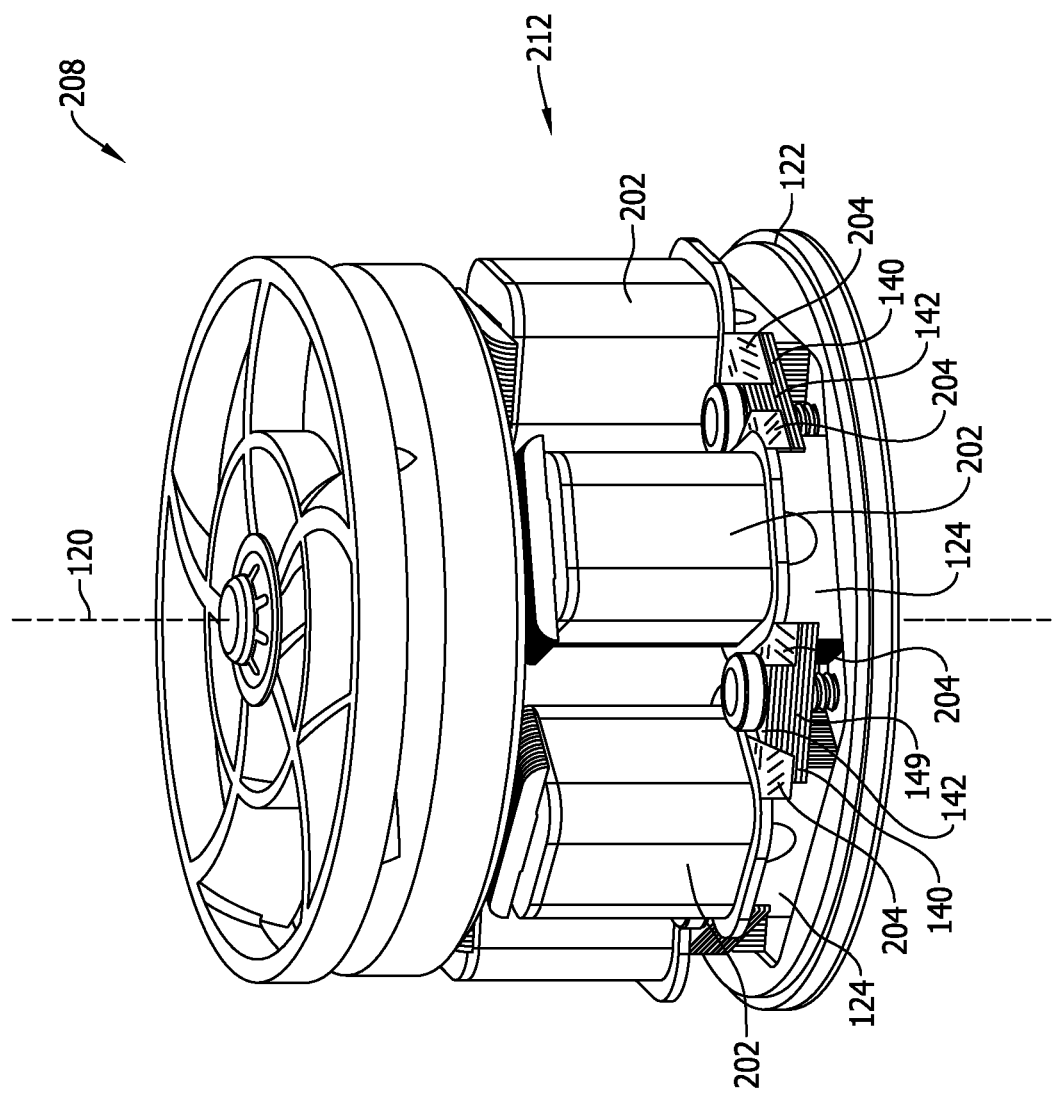
FIG. 3 is a perspective view of an alternative embodiment of a motor illustrating an alternative stator assembly.

As shown in FIGS. 2 and 3, in the exemplary embodiment, tooth tip 134 and stator tooth 132 are integrally formed as a unitary component. Alternatively, tooth tip 134 and stator tooth 132 are separate components coupled together. In another embodiment, tooth assemblies 130 include only stator teeth 132 and not tooth tips 134. In the exemplary embodiment, tooth assembly 130, having tooth tip 134 and stator tooth 132, is fabricated from a plurality of stacked laminated sheets. Such a construction simplifies the manufacturing process and enables tooth assembly 130 to be produced quickly and efficiently. Stator tooth 132 has the substantially same width from an inner edge to an outer edge. This enables the laminated sheets that make tooth assembly 130 to be substantially identical, which lowers manufacturing costs. Similarly, stator base 124 is also formed from a plurality of stacked laminated sheets. More specifically, each laminated sheet of tooth assembly 130 and stator base 124 includes a pair of lamination interlocks that facilitate coupling multiple laminated sheets together to form tooth assembly 130 or stator base 124 having a desired width. The lamination interlocks are formed as a dimple on one side of tooth assembly 130 and stator base 124 and as a projection on the opposing side. As such, the projection of one interlock of a first sheet fits into the dimple of another interlock on an adjacent sheet.

In the exemplary embodiment, stator assembly 112 also includes a plurality of circumferentially-spaced bridge members 140 that engage a pair of circumferentially adjacent stator bases 124 to apply an axial pre-load force to stator bases to retain stator bases 124 in their desired positions and to create a flux path between adjacent stator bases 124. As best shown in FIG. 2, bridge members 140 are substantially trapezoidal in shape and include a first axial surface 142, a second axial surface 144, a first circumferential end surface 146, and a second circumferential end surface 148. In the exemplary embodiment, each stator base 124 includes a pair of substantially similar end shoulders 150 that are each defined by an axial surface 152 and a circumferential end surface 154. In operation, a single bridge member 140 engages adjacent end shoulders 150 of circumferentially adjacent stator bases 124. More specifically, second axial surface 144 of bridge members 140 engages shoulder axial surface 152 of both circumferentially adjacent end shoulders 150 to apply an axial force to axial surface 152. In some embodiments, first circumferential end surface 146 of each bridge member 140 engages the corresponding shoulder circumferential end surface 154 of a first stator base 124 and second circumferential end surface 148 of each bridge member 140 engages the corresponding shoulder circumferential end surface 154 of a second stator base 124 circumferentially adjacent to the first stator base 124.

In the exemplary embodiment, stator assembly 112 also includes a plurality of fasteners 156 that couple bridge members 140 to frame 122. More specifically, each bridge member 140 includes an opening 158 defined therethrough that receives a fastener 156. As best shown in FIG. 1, fasteners 156 extend through openings 158 and between bridge members 140 and frame 122 to secure stator bases 124 to frame 122. As such, fasteners 156 exert an axial force on bridge members 140, which is transferred to stator bases 124 through engagement of at least axial surfaces 144 and 152. In such a configuration, stator bases 124 space bridge members 140 from frame 122 to define a gap 160 therebetween. In the exemplary embodiment, fasteners 156 are non-ferrous screws. In another embodiment, fasteners 156 are rivets or clamps. Generally, fasteners 156 are any type of retention device that facilitates operation of stator assembly 112 as described herein. As such, bridge members 140 apply an axial pre-load force to stator base 124 and holds stator assembly 112 together without the need to over-mold with resin, thus reducing the cost and increasing the efficiency of motor 108.

As best shown in FIGS. 1 and 2, bridge members 140 are formed from a plurality of stacked laminations similar to tooth assemblies 130 and stator bases 124. However, while tooth assemblies 130 and stator bases 124 are formed from vertically oriented laminations, as described above, bridge members 140 are formed from a plurality of horizontally oriented laminations. This difference in orientation between stator bases 124 and bridge members 140 reduces the occurrence of eddy currents and enables the flux to flow efficiently between stator bases 124 because the horizontal laminations of bridge members 140 are oriented in the same direction as the direction of flux flow leaving stator bases 124. Additionally, in one embodiment, stator assembly 112 includes a very thin insulation layer (not shown), such as but not limited to, a sheet of material or an applied coating, between stator bases 124 and bridge members 140 to prevent shorting of the laminations and to further reduce eddy current formation.

As described herein, in the exemplary embodiment, bridge members 140 both apply an axial pre-load force to stator bases 124 and also create an efficient flux path that reduces eddy current formation. In one embodiment, bridge members 140 function to only apply the axial pre-load force and do not facilitate flux flow. In such a configuration, bridge members 140 may be formed from a material other than stacked laminations and function as a clamp to secure stator bases 124 to frame 122. Alternatively, in another embodiment, bridge members 140 function to only facilitate efficient flux flow between adjacent stator bases 124 and do not apply an axial pre-load force to stator bases 124. In such a configuration, bridge members 140 may be formed of horizontally oriented laminations, as in the exemplary embodiment, but are coupled to stator bases 124 using an adhesive.

FIG. 3 is a perspective view of an alternative embodiment of a motor 208 illustrating an alternative stator assembly 212. Stator assembly 212 is substantially similar to stator assembly 112 (shown in FIGS. 1 and 2) in operation and composition, with the exception that the bobbins 202 of stator assembly 212 include extension flanges 204 to retain bridge members 140 rather than fasteners 156. As such, like components shown in FIG. 3, such as stator base 124 and bridge members 140, are labeled with the same reference numbers used in FIGS. 1 and 2.

Stator assembly 212 includes a plurality of bobbins 202 coupled to stator base 124. Each bobbin 202 includes an opening that closely conforms to an external shape of stator tooth 132. As described herein, stator tooth 132 is configured to be inserted into a first end of the bobbin opening and to exit a second end of the opening before stator tooth 132 is coupled to receiving slot 138. Stator assembly 212 may include one bobbin 202 for every tooth 132 or one bobbin 202 positioned on every other tooth 132. Each bobbin 202 also includes an electrical winding (not shown) that includes a plurality of coils that are wound around a respective bobbin 202, which electrically isolates the coils of the winding from stator tooth 132 and tooth tip 134.

In the embodiment shown in FIG. 3, each bobbin 202 includes a pair of extension flanges 204 that extend from opposing circumferential ends of each bobbin 202 axially proximate stator bases 124. Each extension flange 204 engages an adjacent bridge member 140 to hold bridge member 140 in position. More specifically, each extension flange 204 engages both first axial surface 142 and a radially outer surface 149 of its corresponding bridge member 140. In such a configuration, extension flanges 204 apply an axial down force on bridge members 140, in a similar manner as fasteners 156 do for the embodiment in FIGS. 1 and 3, to hold stator bases 124 in place on frame 122. Additionally, extension flanges 204 engage the radially outer surface 149 of bridge members 140 to retain bridge members 140 in place in operation of motor 208.

Figure 4:
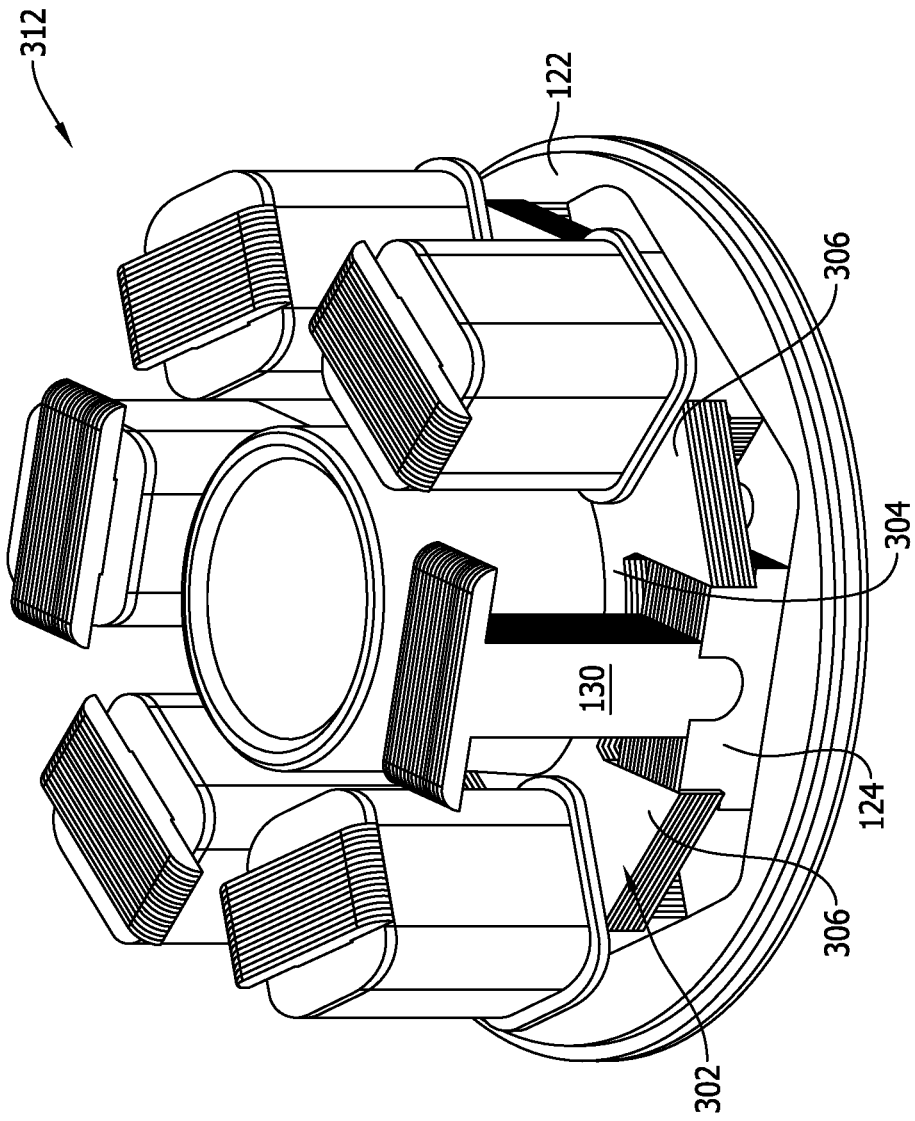
FIG. 4 is a perspective view of another alternative embodiment of a stator assembly.
Figure 5:
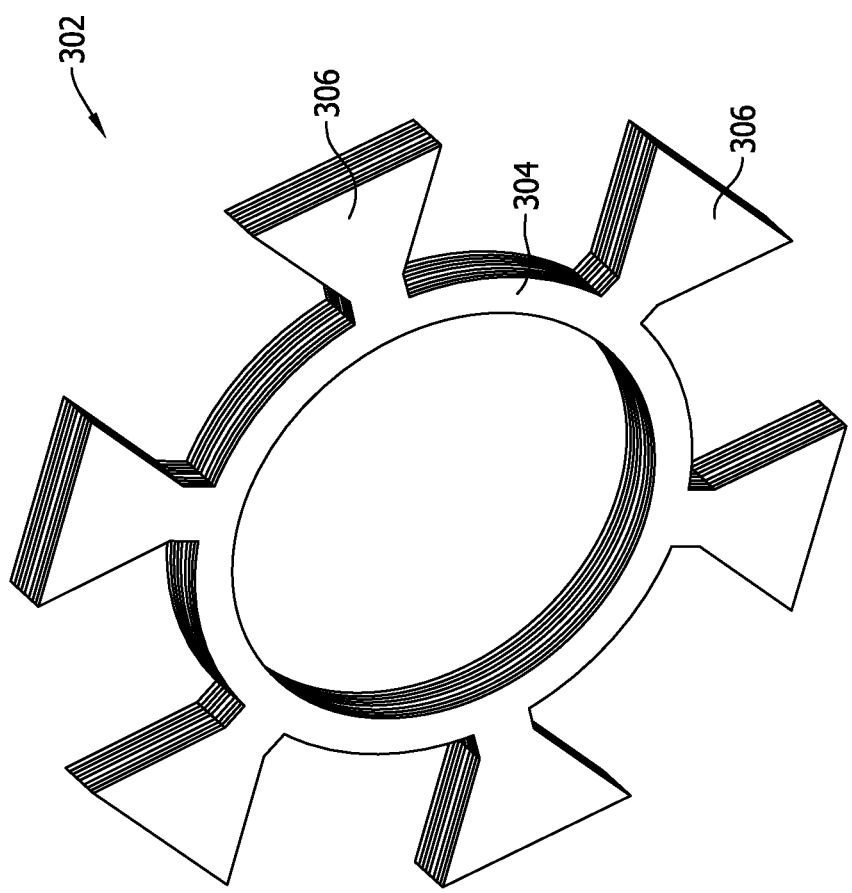
FIG. 5 is a perspective view of an exemplary bridge ring for use in the stator assembly shown in FIG. 4.

FIG. 4 is a perspective view of another alternative embodiment of a stator assembly 312. FIG. 5 is a perspective view of an exemplary bridge ring 302 for use in the stator assembly 312 shown in FIG. 4. Stator assembly 312 is substantially similar to stator assembly 112 (shown in FIGS. 1 and 2) in operation and composition, with the exception that stator assembly 312 includes a bridge ring 302 having a connecting ring 304 and a plurality of bridge members 306 rather than the individual plurality of bridge members 140 in stator assembly 112. As such, like components shown in FIG. 4, such as stator base 124 and tooth assemblies 130, are labeled with the same reference numbers used in FIGS. 1 and 3.

Bridge ring 302 includes connecting ring 304 integrally formed with the plurality of bridge members 306 to connect members 306 together. As shown in FIGS. 4 and 5, connecting ring 304 is positioned radially inward of bridge members 306. In an alternative embodiment, connecting ring 306 is positioned radially outward from bridge members 306. Bridge ring 302 may be used with fasteners 156 of stator assembly 112 or with bobbin extension flanges 204 of stator assembly 212 (when connecting ring 304 is radially inward of bridge members 306). Alternatively, bridge ring 302 may be used independent of fasteners 156 and extension flanges 204. Similar to bridge members 140, bridge ring 302 is formed from a plurality of horizontal laminations for the same reasons as described above. Bridge ring 302 allows for simpler installation of bridge members 306 into stator assembly 312 when manufacturing a large number of stator assemblies 312 with a known number of poles.

An exemplary method of assembling axial flux motor 108 is described herein. The method includes coupling at least one stator base 124 to motor frame 122, wherein stator base 124 includes receiving slot 138. The method also includes inserting a tooth assembly 130 at least partially into the receiving slot 138 of each stator base 124. The method also includes coupling bridge member 140 to a pair of circumferentially adjacent stator bases 124 such that bridge member 140 extends between the circumferentially adjacent stator bases 124 and applies an axial pre-load force to stator bases 124.

Described herein are exemplary methods and systems for axial flux electric motors. The axial flux motor includes a multiphase stator having substantially similar stator bases and substantially similar tooth assemblies made from economical laminations, which enables a modular construction. The stator bases include a receiving slot that mates with an insertable portion of the tooth assembly to form a mechanical joint therebetween. Furthermore, a bridge member is coupled between circumferentially adjacent stator bases to both apply an axial pre-load force to the stator bases and also to facilitate the flow of flux between adjacent stator bases. The laminations that make up the bridge member are oriented such that the flux direction does not create eddy currents but yet allows the lamination direction to create a structural member to hold the stator components in place. The mechanical joints between the tooth assembly and stator base and also between the stator bases and the bridge member hold the stator assembly together without the need to over-mold the stator assembly with resin, thus reducing the cost and increasing the efficiency of the motor. The resulting configuration allows for a customized motor size and also for relatively small 6 slot/4 pole motors for use in high speed blowers and draft inducers.

Exemplary embodiments of the axial flux electric machine assembly are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for use in an axial flux electric motor, said stator assembly comprising:
   a plurality of tooth assemblies;
   a plurality of circumferentially-spaced stator bases, wherein each stator base is coupled to at least one tooth assembly; and
   a plurality of circumferentially-spaced bridge members, wherein each bridge member is configured to engage a pair of circumferentially adjacent stator bases, wherein each stator base comprises a pair of end shoulders, and wherein each bridge member engages adjacent end shoulders of circumferentially adjacent stator bases, and wherein each end shoulder comprises a base axial surface, and wherein each bridge member comprises a bridge axial surface that engages said base axial surface to apply an axial pre-load force.

2. The stator assembly in accordance with claim 1, further comprising a frame and a plurality of fasteners, wherein each bridge member includes an opening defined therethrough configured to receive a corresponding fastener of said plurality of fasteners.

3. The stator assembly in accordance with claim 2, wherein said plurality of fasteners extend between said bridge members and said frame to apply an axial pre-load force to said stator bases.

4. The stator assembly in accordance with claim 1, wherein said plurality of tooth assemblies and said plurality of stator bases are each formed from a plurality of vertically oriented laminations, and wherein said plurality of bridge members are formed from a plurality of horizontally oriented laminations, wherein a flux path is formed between adjacent stator bases through a respective bridge member.

5. The stator assembly in accordance with claim 1, further comprising a connecting ring integrally formed with said plurality of bridge members.

6. The stator assembly in accordance with claim 1, further comprising a plurality of bobbins configured to be coupled about a corresponding tooth assembly of said plurality of tooth assemblies, wherein each bobbin comprises at least one extension flange configured to engage an adjacent bridge member of said plurality of bridge members.

7. The stator assembly in accordance with claim 6, wherein said at least one extension flange engages an axial surface of said adjacent bridge member and a radial surface of said adjacent bridge member.

8. An axial flux electric motor comprising:
   a rotor assembly; and
   a stator assembly coupled to said rotor assembly to define an axial gap therebetween, wherein said stator assembly comprises:
      a plurality of tooth assemblies;
      a plurality of circumferentially-spaced stator bases, wherein each stator base is coupled to at least one tooth assembly;
      a plurality of circumferentially-spaced bridge members, wherein each bridge member is configured to engage a pair of circumferentially adjacent stator bases; and
      an insulation layer positioned between said stator bases and said bridge members.

9. The axial flux electric motor in accordance with claim 8, further comprising a frame and a plurality of fasteners, wherein each bridge member includes an opening defined therethrough configured to receive a corresponding fastener of said plurality of fasteners, wherein said plurality of fasteners extend between said bridge members and said frame to apply an axial pre-load force to said stator bases.

10. The axial flux electric motor in accordance with claim 8, wherein each stator base comprises a pair of end shoulders, and wherein each bridge member engages adjacent end shoulders of circumferentially adjacent stator bases.

11. The axial flux electric motor in accordance with claim 8, wherein said plurality of tooth assemblies and said plurality of stator bases are each formed from a plurality of vertically oriented laminations, and wherein said plurality of bridge members are formed from a plurality of horizontally oriented laminations, wherein a flux path is formed between adjacent stator bases through a respective bridge member.

12. The axial flux electric motor in accordance with claim 8, further comprising a connecting ring integrally formed with said plurality of bridge members, wherein said connecting ring is positioned one of radially inward of or radially outward from said plurality of bridge members.

13. A method of assembling an axial flux electric motor, said method comprising:
   coupling a plurality of circumferentially-spaced stator bases to a frame;
   coupling at least one tooth assembly to each stator base;
   coupling a bridge member to a pair of circumferentially adjacent stator bases such that the bridge member extends between the circumferentially adjacent stator bases;
   coupling a bobbin to at least one of the tooth assemblies; and
   engaging the bridge member with an extension flange of the bobbin.

14. The method of claim 13, further comprising:
   inserting a fastener through an opening defined in the bridge member; and
   coupling the fastener to the frame to apply an axial pre-load force to the stator bases.

15. The method of claim 13, wherein coupling the bridge member comprises coupling the bridge member to an end shoulder of each of the circumferentially adjacent stator bases such that the bridge member is spaced from the frame by the circumferentially adjacent stator bases.

16. The method of claim 13, wherein engaging the bridge member comprises engaging an axial surface of the bridge member and a radial surface of the bridge member with the extension flange.

17. A stator assembly for use in an axial flux electric motor, said stator assembly comprising:

a plurality of tooth assemblies;

a plurality of circumferentially-spaced stator bases, wherein each stator base is coupled to at least one tooth assembly;

a plurality of circumferentially-spaced bridge members, wherein each bridge member is configured to engage a pair of circumferentially adjacent stator bases; and a connecting ring integrally formed with said plurality of bridge members.

18. A stator assembly for use in an axial flux electric motor, said stator assembly comprising:

a plurality of tooth assemblies;

a plurality of circumferentially-spaced stator bases, wherein each stator base is coupled to at least one tooth assembly;

a plurality of circumferentially-spaced bridge members, wherein each bridge member is configured to engage a pair of circumferentially adjacent stator bases; and a plurality of bobbins configured to be coupled about a corresponding tooth assembly of said plurality of tooth assemblies, wherein each bobbin comprises at least one extension flange configured to engage an adjacent bridge member of said plurality of bridge members.

19. A method of assembling an axial flux electric motor, said method comprising:

coupling a plurality of circumferentially-spaced stator bases to a frame, wherein each stator base includes a pair of end shoulders that each include a base axial surface;

coupling at least one tooth assembly to each stator base; and coupling a bridge member to a pair of circumferentially adjacent stator bases such that the bridge member extends between adjacent end shoulders of circumferentially adjacent stator bases, and wherein each bridge member comprises a bridge axial surface that engages the base axial surface to apply an axial pre-load force.

* * * * *